United States Patent [19]

Dulaney et al.

[11] Patent Number: 5,012,234
[45] Date of Patent: Apr. 30, 1991

[54] USER ACTIVATED MEMORY PROGRAMMING AUTHORIZATION IN A SELECTIVE CALL RECEIVER

[75] Inventors: Randi L. Dulaney, Boca Raton; Pamela A. Rakolta, Lake Worth, both of Fla.

[73] Assignee: Motorola, Inc., Schaumburg, Ill.

[21] Appl. No.: 347,549

[22] Filed: May 4, 1989

[51] Int. Cl.⁵ ............................................. G08B 5/22
[52] U.S. Cl. ........................ 340/825.44; 340/825.31; 455/186
[58] Field of Search ........................................ 364/400; 340/825.44–825.48, 825.31, 311.1; 455/603, 186

[56] References Cited

U.S. PATENT DOCUMENTS 4,422,071 12/1983 de Graaf .
4,525,865 6/1985 Mears .
4,626,848 12/1986 Ehlers ........................... 358/194.1 X
4,652,860 3/1987 Weishaupt et al. ......... 340/825.31 X
4,839,628 6/1989 Davis et al. .

Primary Examiner—Ulysses Weldon
Attorney, Agent, or Firm—Philip P. Macnak; Vincent B. Ingrassia; William E. Koch

[57] ABSTRACT

A selective call receiver with memory is described for use in a system providing user initiated alteration of the content of the memory using reconfiguration information transmitted from an external source. The receiver comprises a circuit for generating a user activated programming authorization signal, a receiver for receiving the transmitted reconfiguration information, and a circuit for altering the content of the memory in response to the received reconfiguration information only in the presence of the user activated programming authorization signal.

19 Claims, 6 Drawing Sheets

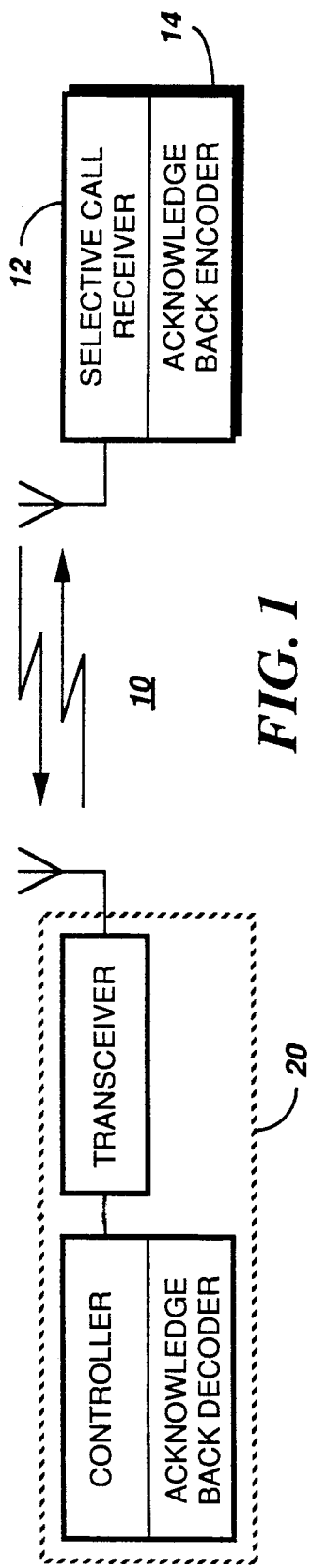
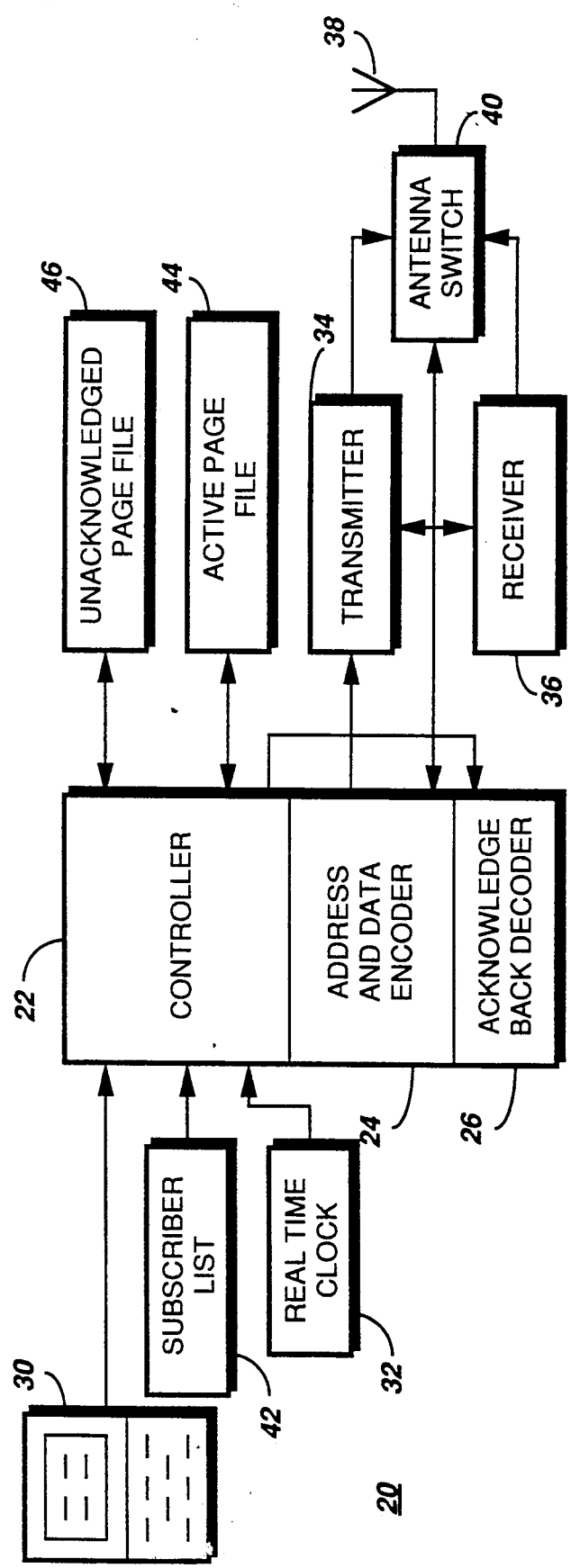

USER ACTIVATED MEMORY PROGRAMMING AUTHORIZATION IN A SELECTIVE CALL RECEIVER

BACKGROUND OF THE INVENTION

1. Field of the Invention

This invention relates to portable communication receivers having memories, regions of which may be selectively protected, and more particularly to a method and apparatus for providing user control of the remote programming of certain of the memory regions.

2. Description of the Prior Art

A number of portable communication receivers, in particular selective call receivers, or pagers, are capable of being remotely programmed, i.e. programmed by information transmitted on the receivers operating channel or frequency. Such programming has become known as over-the-air programming as compared to earlier programming methods which required the placement of the receiver in a fixture which may directly or indirectly contact the receiver in which to effect the programming. Such remotely programmable receivers provide both the user and the system operator with increased benefits which derive from their use. The user benefits by being able to request new or improved features which may now be provided without the user having to return the receiver to the system operator to make the changes. Changes, such as adding or deleting additional addresses to which the receiver is responsive, or the addition or deletion of a receiver option, can now be readily made. The system operator also benefits by being able to make these changes over-the-air at his convenience rather than at the immediate request of the user when the user arrives at the office. The system operator further benefits by being able to remotely reconfigure any or all of the receivers operating within the system in order to achieve increased message throughput and other system performance improvements when they are required, without having to recall all the receivers that are presently in operation. Such benefits, however, are offset by a number of problems heretofore not previously encountered in conventional systems where the programming is performed in the system operator's office.

One receiver having the capability of being programmed over-the-air is described in U.S. Pat. No. 4,839,628 to Davis et al., entitled "Paging Receiver having Selectively Protected Regions of Memory". The receiver utilizes protected regions of memory to prevent inadvertent modification of the memory contents, and further utilizes a password which must be transmitted together with the reconfiguration information. The password is used to protect against inadvertent modification of the memory contents in the event the receiver receives information directing such modification without the password. When the system operator controls the remote programming of the system receivers, such password protection is generally very effective. However, password protection becomes less effective when the user has the ability to call directly in to the paging terminal to request a change to the user's receiver to be made. Should a particular user's password become known, or should a group a user's passwords become known to some individuals, the possibility of mischievous or malicious sabotage of the individual's receiver or the group of receivers could occur. A method of preventing such sabotage is required.

When over-the-air programming of the receiver is executed, the reconfiguration information is first loaded into a temporary storage region of memory which is not protected, prior to reconfiguring the receiver's protected memory areas. This non-protected memory area may be a portion of the memory available in which messages are stored as they are received. When features of the receiver are to be changed by over-the-air reprogramming, generally only a small number of memory locations are required to temporarily store the reconfiguration information. However, some receiver changes, such as reconfiguring the entire operation of the receiver, may require most, if not all, of the available non-protected memory space available. When such remote programming is undertaken, all stored messages would have to be overwritten by the reconfiguration information, including messages which may have yet to have been read, in order that the change be made in the most efficient manner, with the least amount of air time utilized. Loss of such information by the user could pose a serious problem. A means is required which will provide notification to the user of any reprogramming activity which would present an impending loss of messages stored in the non-protected memory regions.

SUMMARY OF THE INVENTION

A selective call reCeiver with memory is described for use in a system providing user initiated alteration of the content of the memory using reconfiguration information transmitted from an external source. The receiver comprises a means for generating a user originated programming authorization signal, a means for receiving the reconfiguration information, and a means for altering the content of the memory in response to receiving the reconfiguration information only in the presence of the programming authorization signal.

A radio having a memory is further described for operation in an acknowledge back system which provides a transmitted notification signal for requesting programming authorization followed by reconfiguration information. The radio comprises a means for receiving the notification signal and for generating a sensible alert in response to the received notification signal. The radio also comprises a means for determining the memory space available for temporary storage of the reconfiguration information in response to receiving the notification signal, and a means for generating and transmitting an acknowledgement signal indicative of the memory space available. The radio further comprises a means for generating a user originated programming authorization signal, a means for receiving the reconfiguration information transmitted in a form consistent with the memory space available following the notification signal, and a means for altering the content of the memory in response to receiving the reconfiguration information only in the presence of the programming authorization signal.

It is an object of the present invention to provide a user authorization for the remote programming of a memory in a selective call receiver.

It is a further object of the present invention to provide a user authorization which is manually activated.

BRIEF DESCRIPTION OF THE DRAWINGS

The features of the invention which are believed to be novel are set forth with particularity in the appended claims. The invention itself, however, together with its further objects and advantages thereof, may be best understood by reference to the following description when taken in conjunction with the accompanying drawings, in which:

FIG. 1 is a block diagram of a radio communication system in which the present invention may be advantageously used.

FIG. 2 is a block diagram of a paging terminal and associated apparatus used to send addresses and messages to the system receivers, and to initiate reprogramming of the system receivers.

DESCRIPTION OF THE PREFERRED EMBODIMENTS

Figure 3:
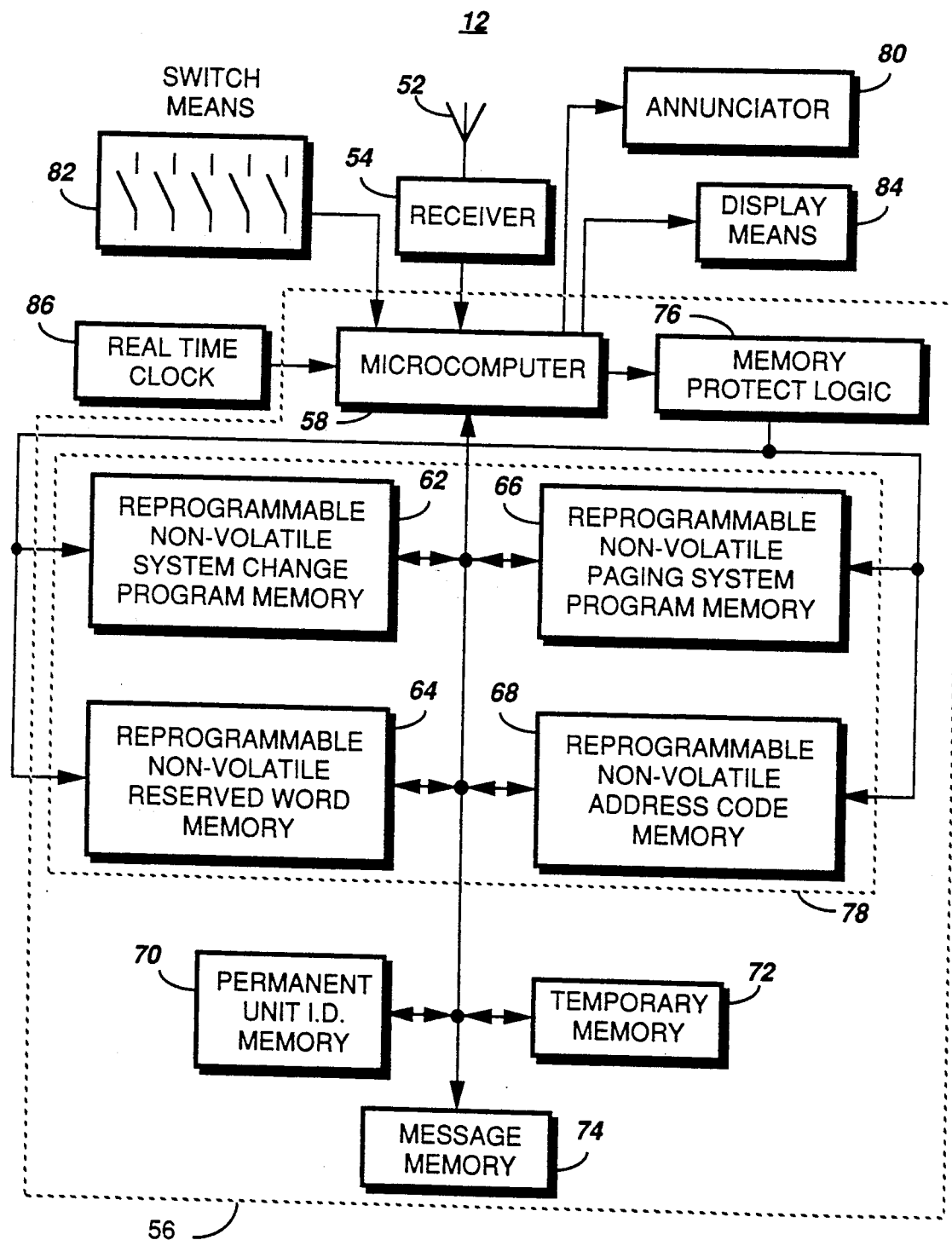
FIG. 3 is a functional block diagram of a selective call receiver having memory employing the present invention which is capable of having the memory remotely altered by reconfiguration signals received over a radio frequency communication link.

Reference is now directed to the drawings, and in particular to FIG. 1 which shows a communication system 10 in which the present invention may be advantageously utilized. The system includes a terminal apparatus 20, and a plurality of selective call receivers 12 having remotely programmable memory. Such receivers are described in U.S. Pat. No 4,839,628 to Davis et al., entitled "Paging Receiver having Selectively Protected Regions of Memory". System 10 is shown as providing acknowledge back capability, which is required for one of the embodiments of the present invention as will be described in detail shortly. Terminal 20 is capable of generating and transmitting selective call messages to which the selective call receivers are responsive in a manner well known to one of ordinary skill in the art. Terminal apparatus 20 also functions as an external source for remotely generating and transmitting reconfiguration information used to alter the content of the memory of the selective call receiver.

Terminal apparatus 20 of FIG. I is shown in greater detail in FIG. 2 together with the associated equipment and the paging files intended to be generated to effect the advantages of the present invention. As shown therein, terminal apparatus 20 includes a controller 22 which, inter alia, also includes an address and data encoder 24 and an acknowledge back decoder 26. Associated with controller 22 is an entry device 30, a real time clock 32, and a transmitter 34 and receiver 36 operating in connection with antenna 38 and antenna switch 40.

Entry device 30 is used by the system operator to access controller 22 to enter receiver ID's (identification numbers) and messages therefor for subsequent transmission. Entry device 30 as shown is a video display terminal which is useful for entering numeric or alphanumeric messages, for entering information for remotely altering the content of the memory of the selective call receivers, and for accessing and updating the subscriber list 42. Subscriber list 42 contains several items that will be needed by controller 22 to transmit a selective call message, or page, including such information as the selective call receiver ID and the associated receiver type (acknowledge back or non-acknowledge back and numeric, alphanumeric or tone), the particular receiver address, and the programming authorization number. Additional entry devices, such as touch tone telephones may be interconnected to controller 22 through a local telephone network for providing direct user access to controller 22 for sending selective call messages and for initiating requests for remote reprogramming of various receiver functions.

As may be appreciated, controller 22 is the essential heart of system 10 and controls the operation of the other associated elements of terminal apparatus 20. In addition to the subscriber list 42 maintained by controller 22, an active page file 44 is maintained and comprises a temporary file containing information about the selective call messages and memory reconfiguration information being processed by terminal apparatus 20. The active page file 44 includes the receiver address and associated message information for selective call messages. The active page file 44 also includes the receiver address, a programming access code and the requested reconfiguration information for remote, or over-the-air reprogramming of the receiver memory. When acknowledge back capability is provided in the system, an unacknowledged page file 46 is likewise maintained in which undelivered messages are stored. The unacknowledged page file 46 may also be used to temporarily store reconfiguration information for which the transmission is delayed at the request of a receiver, as will be described in detail shortly. The real time clock 32 is used to supply timing information to controller 22 and for time stamping undelivered or delayed messages and delayed reconfiguration information in the unacknowledged page file 46.

Address and data encoder 24 accepts the selective call receiver ID and message information and formats the corresponding address and message to the actual transmitted bit patterns in a manner well known in the art. Address and data decoder 24 also accepts the request for memory alteration, formatting the corresponding bit pattern for over-the-air reprogramming of the memories of the selective call receivers. These bit patterns are subsequently transmitted by transmitter 34 through antenna switch 40 and antenna 38 which radiates the signal to the receivers. When acknowledge back capability is provided the selective call receivers include a transmitter for transmitting an acknowledge back response generated by acknowledge back encoder in a manner well known in the art. Acknowledge back decoder 26 detects and processes these acknowledgements and provides this information to controller 22. When acknowledge back capability is provided in selective call receiver 12, and receiver 12 is capable of being over-the-air reprogrammed, controller 22 can be directed by the acknowledge back response to delay the transmission of reconfiguration information, and to transmit the reconfiguration information in a data block size consistent with the temporary memory space available in the receiver, as will be described in detail later.

FIG. 3 is a functional block diagram of a selective call receiver 12 constructed in accordance with the present invention. Selective call receiver 12 includes antenna 52 and receiver 54 for generally receiving transmitted selective call addresses and message information in a manner well known in the art. Antenna 52 and receiver 54 are also capable of receiving transmitted coded information used to reconfigure the operation of the selective call receiver. The output of receiver 54 is a stream of binary information which couples to microcomputer 58. Microcomputer 58 is part of decoding system block 56 performing such functions as address decoding, and control of message storage and display functions in a manner well known in the art. Decoding system block 56 may include, in addition to microcomputer 58, temporary memory 72, message memory 74, memory protect logic 76 and protected memory area 78. The content of the protected memory areas can be altered only in response to receiving the reconfiguration information in the presence of a user activated programming authorization signal, to be described shortly. A complete description of the elements of decoding system block 76 is provided in U.S. Pat. No. 4,839,678 to Davis et al., entitled "Paging Receiver having Selectively Protected Regions of Memory" which is assigned to the assignee of the present invention, the disclosure of which is hereby incorporated by reference herein.

When an address is received by communication receiver 12, the address is compared to one or more predetermined addresses stored in reprogrammable non-volatile address code memory 68 in a manner well known to one of ordinary skill in the art. When the received address matches one of the stored predetermined addresses, the message segment transmitted following the receiver address is processed by microcomputer 58 and stored in message memory 74. A sensible alert is generated, such as an audible or tactile alert which is delivered by annunciator 80 which may be a transducer when an audible alert is generated or a vibrator when a tactile alert is generated, alerting the user of the received message. The stored message may be recalled from message memory 74 by the user with switch means 82, which effects the reading of the stored message for presentation on display means 84 for the user's review. Switch means 82 can be implemented using one or more mechanical or electronic switches to provide user activatable functions. In addition to reading the stored messages, the switch means 82 provides for such additional functions as resetting the sensible alert, scrolling through a menu of receiver functions, selecting a particular receiver function, and controlling the setting and display of time, when real time clock 86 is provided as shown. Switch control of such functions is well known in the art.

Figure 4:
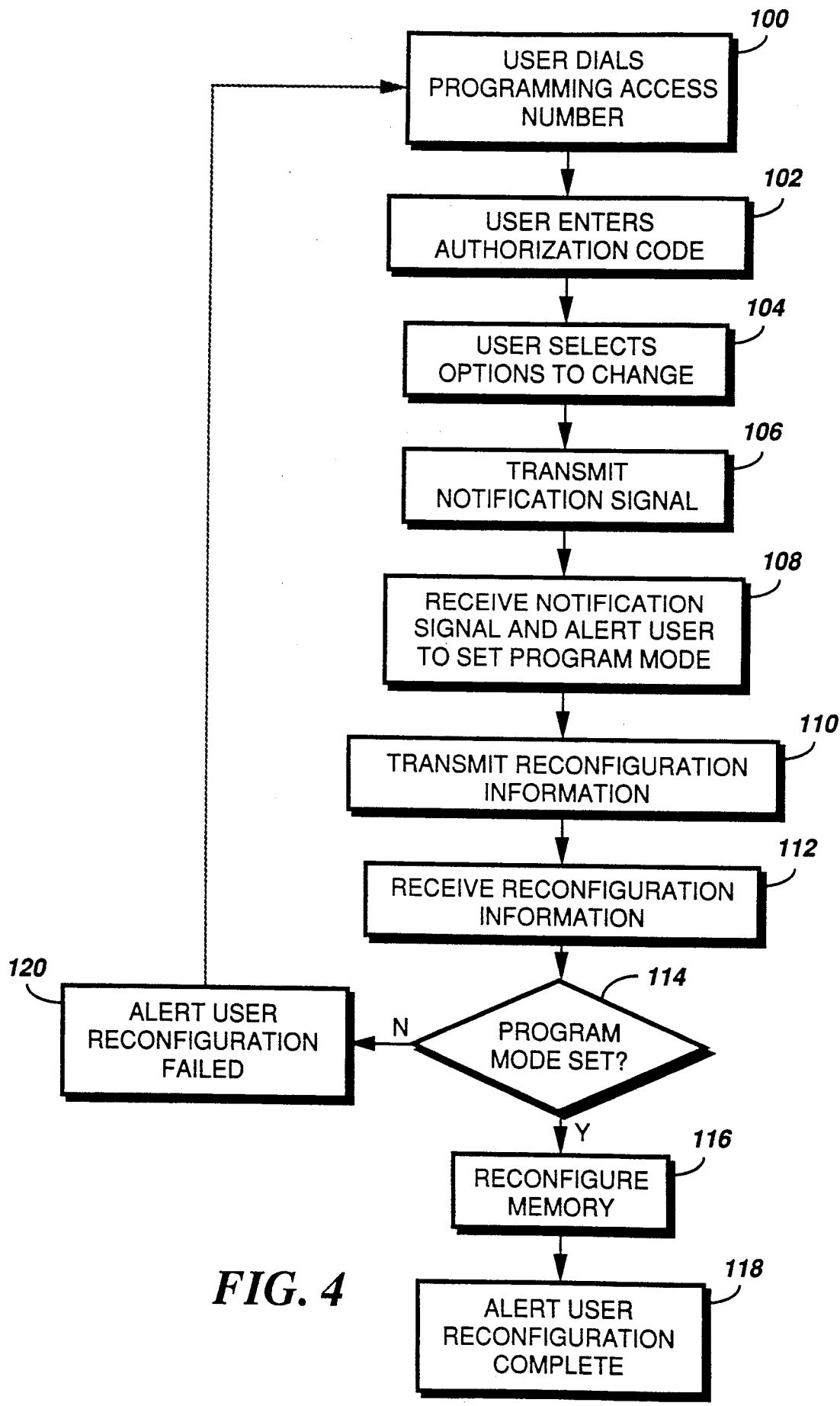
FIG. 4 is a flow chart illustrating user initiated reconfiguration of the memory of a selective call receiver by reconfiguration information received over a radio frequency communication link, without the requirement of system operator intervention.

Unlike the receiver described in U.S. Pat. No. 4,839,628 to Davis et al., which can be reprogrammed over-the-air when an access code is transmitted with the reconfiguration information, the receiver of the present invention also requires the user to manually authorize such reprogramming before the actual reprogramming can be accomplished. This is important, especially where the user or any other party can directly initiate such over-the-air reprogramming. FIG. 4 is a flow diagram illustrating such user initiated alteration of the memory of a receiver by reconfiguration information received over a radio frequency communication link, without the requirement of the intervention of a system operator. In the preferred embodiment of the present invention, the user is able to initiate the over-the-air reprogramming in much the same manner as is required to initiate a numeric or other message to be transmitted to the receiver. However, instead of dialing a number corresponding to the request to send a message to the receiver, the user dials a special programming access number, at block 100, to initiate the over-the-air reprogramming sequence. A standard touch-tone phone may be used as the entry device as previously described, or when available an alphanumeric entry terminal may be used as well for this purpose. The user is prompted to enter an authorization code which is checked against the access code dialed. After the terminal apparatus confirms the user is authorized to request the change, the user is prompted to select the options which are desired to be changed, at block 104. Changes which can be requested can include programming of additional addresses, changes of address priority, or page type associated with individual addresses, and any other changes which would affect the operation of the receiver in response to receiving an address. Other changes may also be able to be initiated only by the system operator, such as changing the signaling format to which the receiver is to respond. Such changes as changing the signaling format would be transparent to the receiver user and would not require a user activated reprogramming authorization. Other changes, such as disabling reception of the receiver for non-payment of monthly charges, would also bypass the requirement for user activated reprogramming authorization.

The terminal apparatus, upon receiving the change input, formats the reconfiguration information in much the same manner as a data page. The reconfiguration information preferably includes an address unique to the receiver being reprogrammed, followed by a special programming access code and the specific reconfiguration data which is to be transmitted. The transmission of the special reprogramming access code following the unique receiver address provides an additional level of security to prevent inadvertent alteration of the receiver memory, as compared to simply transmitting a single unique reprogramming address followed by the reconfiguration information. The terminal apparatus may also transmit a notification signal, at block 106, prior to the transmission of the reconfiguration information to inform the user to set the programming mode. When operator initiated memory alteration is transmitted which does not require user authorization, such notification signal would not be transmitted. The use of a notification signal when the user has real time over-the-air programming access is also optional, as the user would know when to manually activate the programming mode in the instance where the user places the call initiating the memory alteration. When the notification signal is transmitted, upon receiving the notification signal a sensible alert is generated alerting the user to set the programming mode, at block 108.

In the preferred embodiment of the present invention, the user generates a user activated programming authorization signal by manually activating three of the switches controlling the operation of the receiver. The preferred sequence is to actuate and hold the "menu select" switch followed by the "time set" switch. Thereafter, depressing the "read/reset" switch would place the receiver in the reprogramming mode. The sequence of the switch activation is by way of example only, and it will be appreciated any switch sequence may be utilized which would minimize the potential of inadvertently entering the programming mode through any normal switch actuation sequences. When the programming mode has been entered, the user activated programming authorization signal is generated for a predetermined time interval, such as for a period of five minutes, which is sufficiently long to insure reception of the transmitted reconfiguration information. The time period required for the user activated programming authorization signal is determined by a number of factors, such as the queuing time to the transmission of the reconfiguration information, and the time to transmit the reconfiguration information. Generation of the user activated programming authorization signal by a microcomputer for a predetermined period of time is well known in the art. The reconfiguration information is then transmitted, at block 110, after a suitable delay, such as from one to two minutes, to allow the user time to set the programming mode. When a notification signal is not transmitted notifying the user to set the programming mode, the programming mode must be set by the user prior to completion of the change request to insure being set when the reconfiguration information is transmitted. Upon receiving the reconfiguration information, at block 112, the microcomputer verifies the programming mode is set, at block 114. If the programming mode is set, the microcomputer alters the appropriate memory region as described in U.S. Pat. No. 4,839,628 to Davis et al, at block 116. Upon completion of the memory alteration, a unique sensible alert is generated informing the user the alteration is complete, at block 118. The programming time interval is also reset by the microcomputer so that any following messages may be received normally. The sensible alert generated may be audible, tactile or visual. Should the program mode not be set, at block 114, due either to the user failing to set the programming mode, or due to the predetermined programming time interval having timed out before the reconfiguration information was transmitted, the user is alerted that the memory alteration attempt failed, at block 120. The user then has the option to retry the reprogramming sequence beginning at block 100.

Figure 5:
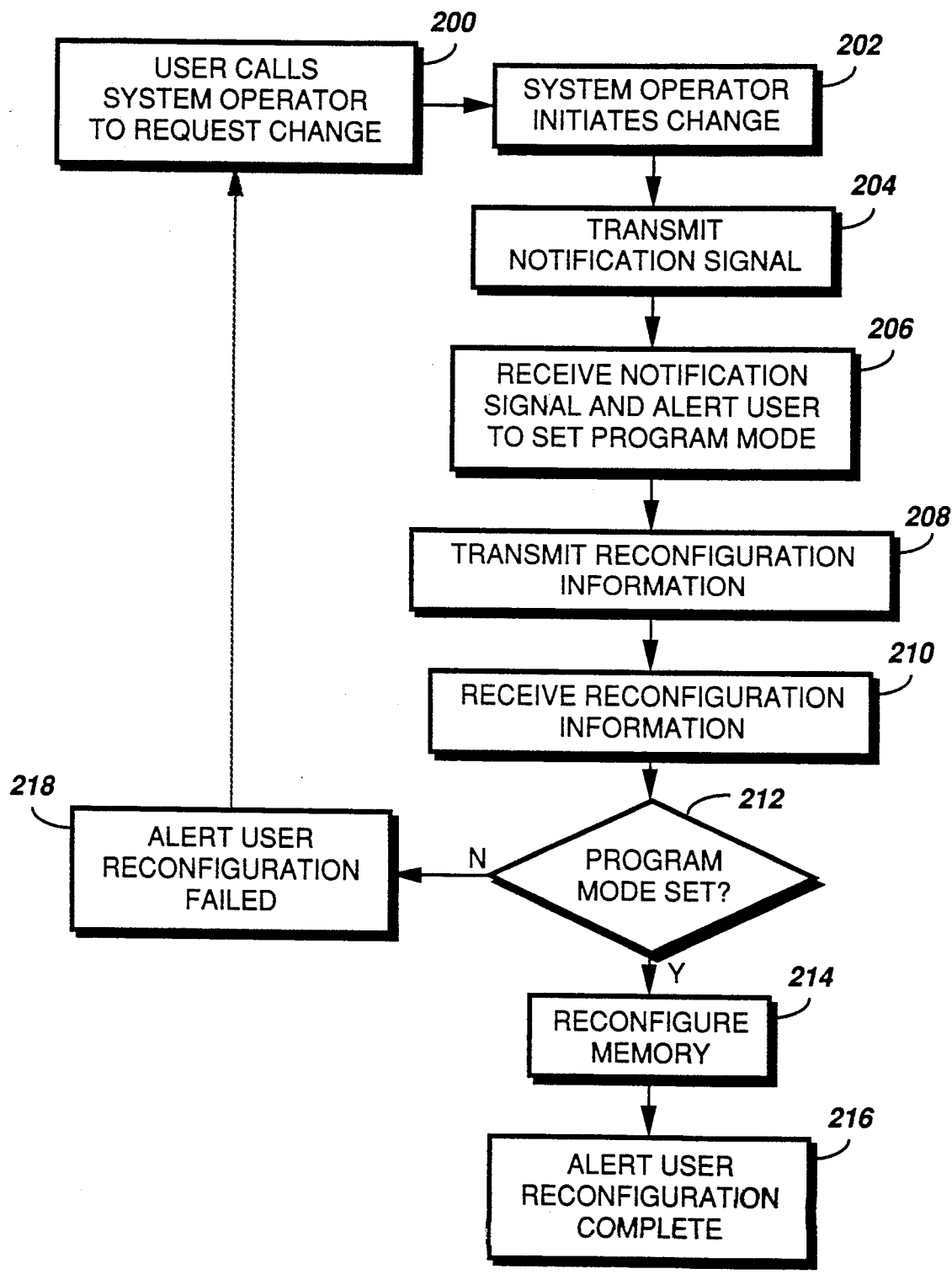
FIG. 5 is a flow chart illustrating user initiated reconfiguration of the memory of a selective call receiver by reconfiguration information received over a radio frequency communication link, with the requirement of system operator intervention.

Automatic user initiated memory alteration, as described in FIG. 4 is not feasible with a terminal which does not accept a direct user input to request reprogramming. In such a case, the user can still initiate a request for memory alteration as shown in FIG. 5, which is a flow chart illustrating user initiated alteration of the memory of a receiver by reconfiguration signals received over a radio frequency communication link, with the requirement of system operator intervention. The user initiates a call to request the change, at block 200. Once the information for reprogramming is provided, the system operator will input the data to generate the appropriate reconfiguration information, at block 202. Because of the system operator intervention, over-the-air reprogramming may not be handled on a real time basis as previously described, but rather may be provided only at specific times during the day, such as during low message traffic hours in the early mornings or late evenings. Prior to transmitting the reconfiguration information, the notification signal is transmitted, at block 204. When the notification signal is received, the user is sensibly alerted to inform the user the program mode must be set, at block 206. After a suitable delay to allow the user to set the programming mode, the reconfiguration information is transmitted, at block 208. When the reconfiguration information is received, at block 210, the microcomputer verifies the programming mode is set, at block 212. If the programming mode is set, the appropriate memory region is altered according to the received reconfiguration information, at block 214, and the user is alerted the reconfiguration is complete, at block 216. The programming time interval is then reset, so that any following messages may be received normally Should the programming time interval have timed out, or should the user have failed to set the programming mode, the user is sensibly alerted that the reconfiguration attempt failed, at block 218. The user then has the option to retry the reprogramming sequence beginning at block 200.

Figure 6:
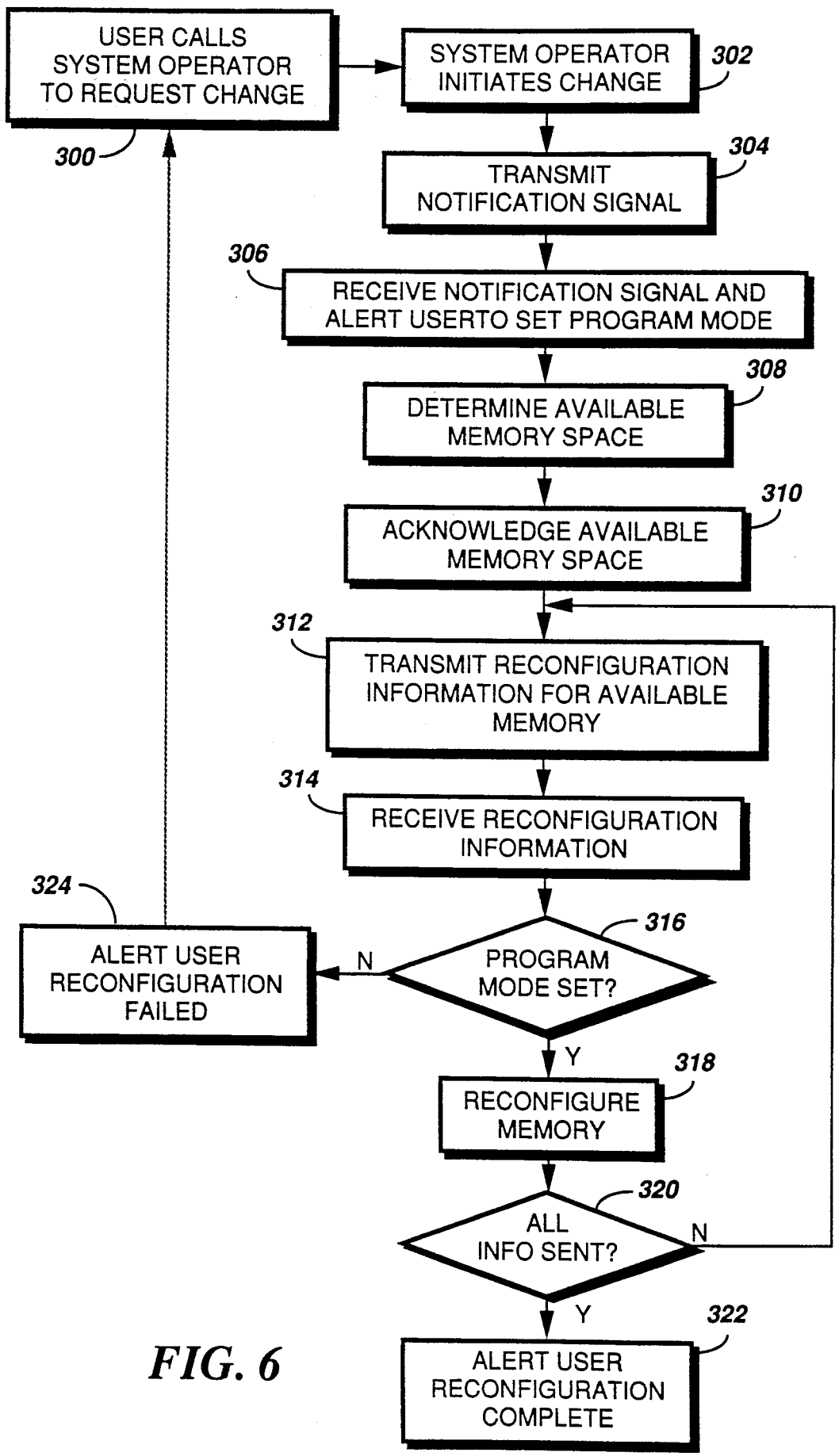
FIG. 6 is a flow chart illustrating reconfiguration of the memory of a receiver having acknowledge back capability for communicating memory space available prior to receiving the reconfiguration signals.

In another embodiment of the present invention, the receiver is provided with a transmitter to acknowledge back information for effecting the reprogramming sequence, such as to acknowledge back the amount of temporary memory space available to store reconfiguration information. Depending upon the microcomputer architecture, the temporary memory space which is available to store the received reconfiguration information may be relatively small. The microcomputer used in the preferred embodiment of the present invention is an MC68HC05L8 manufactured by Motorola. This microcomputer includes 176 bytes of on-board random access memory (RAM) and 128 bytes of window RAM useable for program variable storage, message storage and as temporary memory space to store the reconfiguration information for memory alteration. When the reconfiguration information is allowed to overwrite the stored message information, increased throughput can be achieved. However, such a practice can potentially create user discontent when the received reconfiguration information would potentially overwrite unread or protected message areas. FIG. 6 is a flow chart illustrating memory alteration in a receiver having acknowledge back capability for communicating the temporary memory space available prior to receiving the reconfiguration information. The user initiates a call to request a change, at block 300. Once the information for reprogramming is received, the system operator inputs the data to generate the reconfiguration information, at block 302. Because of the system operator intervention, over-the-air reprogramming may not be real time as previously described. Also, it will be appreciated, user initiated over-the-air reprogramming without system operator intervention can be provided as well, depending upon the terminal apparatus implementation. Prior to transmitting the reconfiguration information, the notification signal is transmitted, at block 304. When the notification signal is received, the user is sensibly alerted to inform the user the program mode must be set, at block 306. The microcomputer determines the memory space available for use as temporary memory space, at block 308, and an acknowledgement signal is generated and transmitted back indicating the available temporary memory space, at block 310. The available temporary memory space is any memory space which does not contain certain messages, such as unread and protected messages. Read messages are allowed to be overwritten should the reconfiguration information received require additional temporary memory space. After the acknowledgment signal has been received, and after a suitable delay to allow the user to set the programming mode, the reconfiguration information is transmitted, at block 312, in data block sizes consistent with the available temporary memory space. When the reconfiguration information is received, at block 314, the microcomputer verifies the programming mode is set, at block 316. If the programming mode is set, the appropriate memory is altered according to the received reconfiguration information, at block 318. The microcomputer then checks to ascertain that all information required to make the requested change has been received, at block 320. When additional information is expected the microcomputer waits for the additional information to be transmitted, at block 312. When all the information has been received, at block 320, the user is alerted the memory alteration is complete, at block 322. The programming time interval is reset upon completing the memory alteration, so that any following messages may be received normally. Should the programming time interval have timed out, or should the user fail to set the programming mode, the user is sensibly alerted that the reconfiguration failed, at block 324. The user then has the option to retry the reprogramming sequence beginning at block 300.

Figure 7:
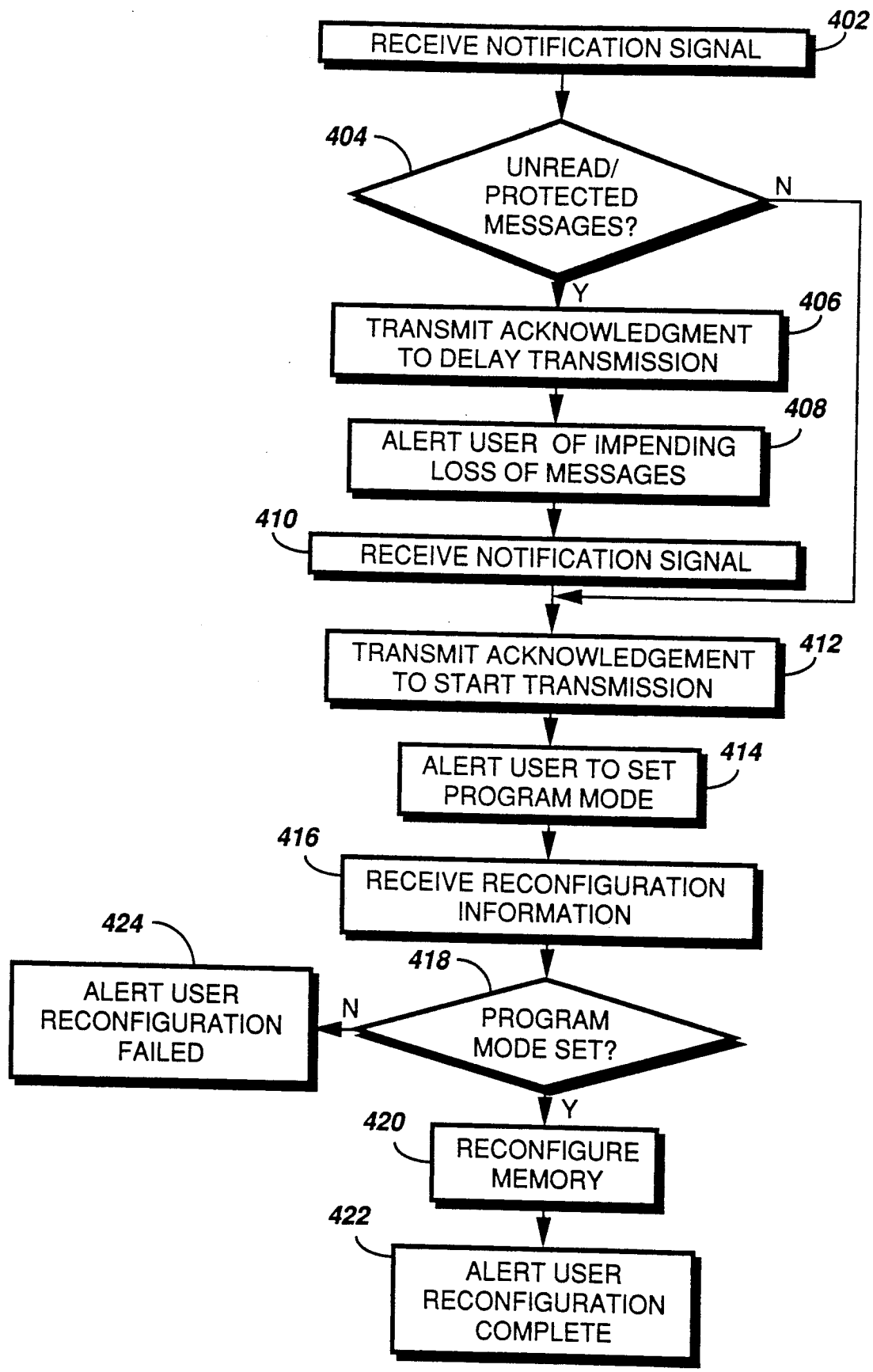
FIG. 7 is a flow chart illustrating reconfiguration of the memory of a receiver having acknowledge back capability for communicating message memory status prior to receiving the reconfiguration signals.

FIG. 7 is a flow chart illustrating memory alteration in a receiver having acknowledge back capability for communicating message memory status prior to receiving the reconfiguration information. In this embodiment, the user is warned that the received reconfiguration information may overwrite some or all of the message memory, and that any unread or protected messages should now be read, as they may be lost in the transmission to follow. As in the previous embodiments, the user or the system operator initiates a call to request a change. After the notification signal is received, at block 402, the microcomputer verifies if the message memory space contains certain messages, such as unread and protected messages, at block 404. When there are no unread or protected messages, an acknowledgement is generated and transmitted requesting to start the transmission of the reconfiguration information, at block 412. When unread or protected messages are detected, the microcomputer generates an acknowledgement signal requesting the transmission of the reconfiguration information be delayed, at block 406. The user is sensibly alerted with an alert distinct from the alert requesting the programming mode to be set, warning the user to the impending loss of these certain messages unless they are read within a predetermined time interval, at step 408. After the predetermined time interval has elapsed, such as a five minute time interval which is sufficient to allow the user to have read all messages stored in the message memory, a second notification signal is received, at step 410, after which an acknowledgement is generated and transmitted requesting to start the transmission of the reconfiguration information, at block 412. The user is sensibly alerted to set the programming mode, at block 414, and after a suitable time is provided for the user to set the programming mode, the reconfiguration information is transmitted. When the reconfiguration information is received, at block 416, the microcomputer verifies the programming mode is set, at block 418. If the programming mode is set, the appropriate memory region is altered according to the received reconfiguration information, at block 420, and the user is alerted the alteration is complete, at block 422. The programming time interval is then reset, so that any following messages may be received normally. Should the programming time interval have timed out, or should the user have failed to set the programming mode, the user is sensibly alerted that the reconfiguration attempt failed, at block 424. The user then has the option to retry the reprogramming sequence beginning at block 402.

While specific embodiments of this invention have been shown and described, further modifications and improvements will occur to those skilled in the art. All modifications which retain the basic underlying principles disclosed and claimed herein are within the scope and spirit of the present invention.

We claim:

1. In a selective call receiver having a memory capable of being altered by reconfiguration information transmissions received over-the-air, an improvement comprising:
   means for receiving the reconfiguration information for altering the memory;
   means for altering the memory; and
   means, operable by the receiver user, for allowing such alteration to occur when the reconfiguration information is received during a predetermined programming time interval.

2. A method for user initiated alteration of a memory in a selective call receiver, using reconfiguration information corresponding to the memory alteration selected by the user and transmitted from an external source, said method comprising the steps of:
   generating, for a predetermined programming time interval, a programming authorization signal activated by the user;
   receiving the transmitted reconfiguration information; and
   altering the memory in response to the received reconfiguration information only in the presence of the programming authorization signal.

3. A selective call receiver, having a memory, for use in a system providing user initiated alteration of the memory using reconfiguration information corresponding to the memory alteration selected by the user and transmitted from an external source, said receiver comprising:
   means for generating, for a predetermined programming time interval, a programming authorization signal activated by the user;
   means for receiving the transmitted reconfiguration information; and
   means for altering the memory in response to the received reconfiguration information only in the presence of the programming authorization signal.

4. The selective call receiver according to claim 3 comprising means responsive to the completion of the memory alteration for terminating the generation of the programming authorization signal prior to the completion of the predetermined programming time interval.

5. The selective call receiver according to claim 4 further comprising means for alerting the user when the memory alteration is completed.

6. The selective call receiver according to claim 4 further comprising means for alerting the user when the memory alteration is not completed within the predetermined programming time interval.

7. A method for altering a memory in a selective call receiver using a notification signal for requesting programming authorization by the selective call receiver user and reconfiguration information transmitted from an external source, said method comprising the steps of:

receiving the notification signal and generating a sensible alert is response thereto;

generating, for a predetermined programming time interval, a programming authorization signal activated by the user in response to the sensible alert being generated;

receiving the transmitted reconfiguration information; and altering the memory in response to receiving the reconfiguration information in the presence of the programming authorization signal.

8. A selective call receiver with a memory, for use in a system providing a notification signal for requesting programming authorization by the selective call receiver user for altering the memory using reconfiguration information transmitted from an external source, said receiver comprising:

means for receiving the notification signal and for generating a sensible alert in response thereto;

means, for generating, for a predetermined programming time interval, a programming authorization signal activated by the user in response to the sensible alert being generated;

means for receiving the transmitted reconfiguration information; and means for altering the memory in response to the received reconfiguration information only in the presence of the programming authorization signal.

9. A method for altering a memory in a radio operating in an acknowledge back system providing a transmitted notification signal requesting programming authorization by the radio user, and reconfiguration information, said method comprising the steps of:

receiving the notification signal and generating a sensible alert in response thereto;

determining the memory space available in response to the receipt of the notification signal;

generating and transmitting an acknowledgement signal indicative of memory space availability;

generating a programming authorization signal activated by the user in response to the sensible alert being generated;

receiving the reconfiguration information transmitted in a form consistent with the memory space available; and altering the memory with the received reconfiguration information when the programming authorization signal is present.

10. The method according to claim 9, wherein aid memory includes a message memory portion, and wherein aid method further comprising the steps of:

determining the status of certain messages stored in the message memory portion in response to receiving the notification signal; and generating a sensible alert signaling the radio user of impending loss of the certain messages when the reconfiguration information is received and the memory is altered.

11. The method according to claim 10 wherein said step of transmitting an acknowledgement signal further comprises the step of transmitting an acknowledge back signal requesting the reconfiguration information transmission be delayed when certain messages are present.

12. The method according to claim 11, wherein a query signal is periodically transmitted following the request to delay transmission of the reconfiguration information, and wherein said method further comprising the steps of:

receiving a query signal requesting the present status of the certain messages in the message memory portion; and transmitting an acknowledge back signal corresponding to the present message memory status.

13. The method according to claim 12 further comprising the step of cancelling the transmission of the reconfiguration information when the present message status is unchanged after a predetermined number of query transmissions.

14. A radio, having a memory for operation in an acknowledge back system which provides a transmitted notification signal for requesting programming authorization by the radio user, and reconfiguration information, said radio comprising:

means for receiving the transmitted notification signal;

means for generating a sensible alert in response to receiving the notification signal;

means for determining the memory space available for temporary storage of the reconfiguration information in response to receiving the notification signal;

means for generating and transmitting an acknowledgement signal indicative of the determined memory space availability;

means for generating a programming authorization signal activated by the user in response to the sensible alert being generated;

said means for receiving the notification signal further for receiving the reconfiguration information transmitted in a form consistent with the memory space available; and means for altering the memory with the received reconfiguration information when the programming authorization signal is present.

15. The radio according to claim 14, wherein said memory includes a message memory portion, and said radio further comprises means for determining the status of certain messages stored in the message memory portion in response to receiving the notification signal, and wherein said means for generating a sensible alert is responsive to said means for determining the status of certain messages for further generating a sensible alert warning the radio user of impending loss of the certain messages.

16. The radio according to claim 15, further comprising means, responsive to said means for determining the status of certain messages, for transmitting an acknowledge back signal requesting the reconfiguration information transmission be delayed when the certain messages are determined to be present.

17. The radio according to claim 16, wherein the system further periodically transmits a query signal requesting the present status of certain messages in the message memory portion following the request to delay transmission of the reconfiguration information, and wherein said means for determining the status of certain messages is responsive to the query signal for determining the present message memory status of the certain messages, and said means for transmitting an acknowledge back signal transmits an acknowledge back signal corresponding to the present message memory status.

18. The radio according to claim 14 wherein the transmission of the reconfiguration information is cancelled when the present message status is unchanged after a predetermined number of query transmissions.

19. The radio according to claim 15, wherein the certain messages include unread and protected messages.

* * * * *